(12) United States Patent
Barrows

(10) Patent No.: US 6,493,068 B1
(45) Date of Patent: Dec. 10, 2002

(54) OPTIC FLOW SENSOR WITH NEGATIVE IRIS PHOTORECEPTOR ARRAY

(75) Inventor: Geoffrey Barrows, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/965,246

(22) Filed: Sep. 28, 2001

(51) Int. Cl.[7] ............................... G01P 3/36; H01J 3/14
(52) U.S. Cl. ...................... 356/28; 250/237 R
(58) Field of Search ......................... 356/28; 250/237 R

(56) References Cited

U.S. PATENT DOCUMENTS

| | | |
|---|---|---|
| 3,612,881 A | 10/1971 | King |
| 3,677,647 A * | 7/1972 | Misek ........................... 356/28 |
| 3,742,233 A | 6/1973 | Gorgens et al. |
| 3,856,403 A * | 12/1974 | Maughmer et al. ............ 356/28 |
| 4,039,825 A | 8/1977 | Doyle |
| 4,092,072 A | 5/1978 | Ellis |
| 4,325,633 A | 4/1982 | Gardner |
| H192 H | 1/1987 | Daehler |
| 4,777,360 A | 10/1988 | Carner, Jr. |
| 5,428,215 A | 6/1995 | Dubois et al. |
| 5,587,580 A | 12/1996 | Venier et al. |
| 5,604,695 A | 2/1997 | Cantin et al. |
| 5,648,846 A | 7/1997 | Douine et al. |
| 5,757,478 A | 5/1998 | Ma |
| 6,020,953 A | 2/2000 | Barrows |
| 6,194,695 B1 | 2/2001 | Barrows |

OTHER PUBLICATIONS

Barrows, Mixed–Mode VLSI Optic Flow Sensors for Micro Air Vehicles, Dissertation submitted Univ. of Maryland, College Park, 1999.

* cited by examiner

Primary Examiner—Stephen C. Buczinski
(74) Attorney, Agent, or Firm—John J. Karasek; John G. Mills, III

(57) ABSTRACT

An improved optic flow sensor is provided which affords enhanced bandwidth without the use of a lens. A plurality of photoreceptor circuits, arranged in a linear array, sense light received from a visual field and produce a plurality of photoreceptor signals in accordance with the light sensed. A negative iris, disposed between the visual field and the photoreceptor circuits, blocks a portion of the light from the visual field so that the light blocked by the negative iris is not received by the photoreceptor circuits. The photoreceptor signals are used in determining optic flow in the visual field. The invention is useful for implementation using micro electromechanical system (MEMS) techniques.

12 Claims, 3 Drawing Sheets

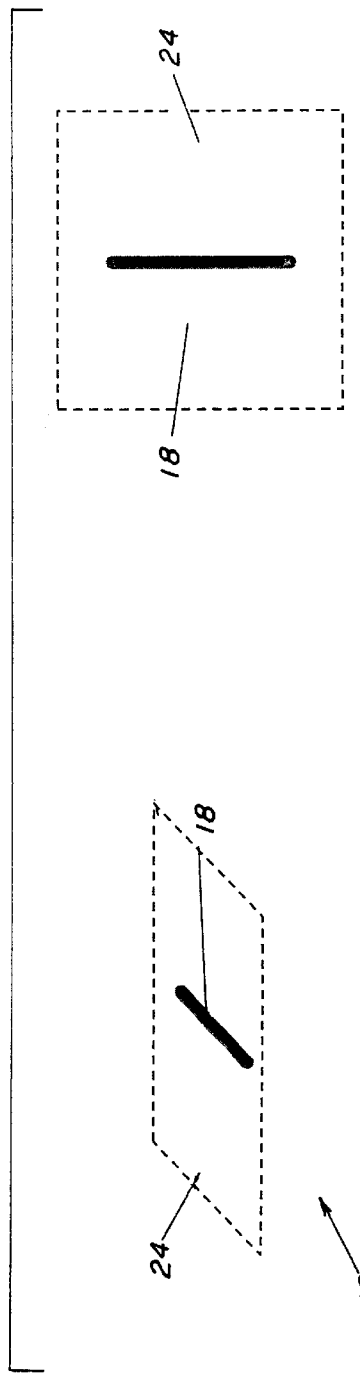
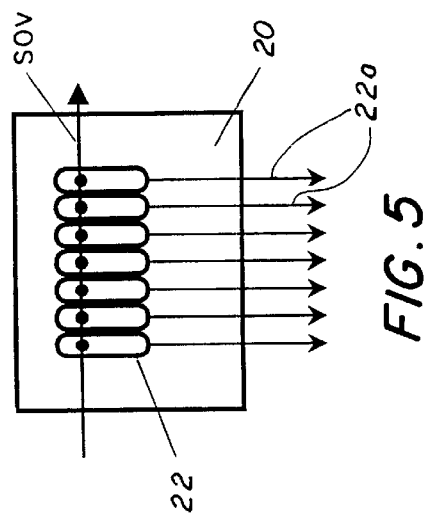
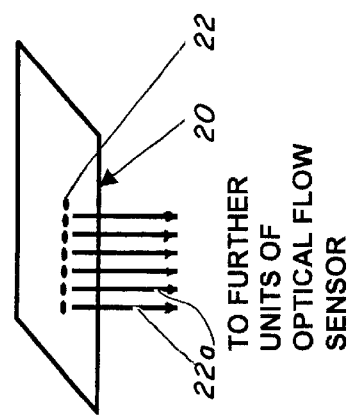
FIG. 4
FIG. 5
FIG. 3

OPTIC FLOW SENSOR WITH NEGATIVE IRIS PHOTORECEPTOR ARRAY

BACKGROUND OF THE INVENTION

1. Field of the Invention

The invention relates to optical flow measurement or computation and, more particularly, to an optic flow sensor incorporating an improved photoreceptor array.

2. Description of the Related Art

As set forth in my earlier U.S. Pat. No. 6,020,953, the subject matter of which is incorporated herein by reference, the term "optical flow" generally refers to the motion of texture seen by an agent (such as an animal or a robot) as a result of relative motion between the agent and other objects in the environment. It is well known that animals, especially insects, use information from the optical flow for depth perception and to move about in an environment without colliding into obstacles. Robotics and machine vision researchers have borrowed from these ideas in biology to build matching vision systems that successfully use optical flow for depth perception and obstacle avoidance. These successes verify that optical flow can indeed be used for depth perception and obstacle avoidance in real systems. In a "neuromorphic" approach, computations are performed with analog or mixed-mode circuitry which exploit the physical dynamics inherent in VLSI circuitry and often mimic biological structures.

In the above-identified patent, there is disclosed a feature tracking linear optic flow sensor which includes photoreceptor array which responds to light from the visual field focussed thereon. In my U.S. Pat. No. 6,194,695 B1, the subject matter of which is also incorporated by reference, a number of different ways are discussed of implementing a photoreceptor array for linear optic flow measurement. By using a combination of electronics and optics, the individual photoreceptors have visual field response functions that are shaped like a fuzzy elongated rectangle. These photoreceptors are also arranged in a linear array so that the direction of the array (the sensor orientation vector or SOV) is perpendicular to the long axis of that rectangle. The patent discusses two general ways in which the elongated photoreceptor receptive field can be created. The first way is to use a phototransistor (photoreceptor) the active area of which is rectangular. In this embodiment, the photoreceptors of the array are located on a focal plane chip. A lens or pinhole focuses an image of the environment or visual field onto the focal plane chip. Thus, the photoreceptors sample a rectangular section of the image, and, therefore, of the visual field. This rectangular response function can be made slightly blurry through the use of optical smoothing by either placing the lens slightly out of focus or by using an iris with a graded transmission function.

The second way to achieve an elongated rectangular photoreceptor receptive function is to use photoreceptors the active areas of which are substantially point-like and to also use an iris with an elongated rectangular shape. With such an arrangement, all the light striking the photoreceptor will be from an elongated rectangular part of the visual field.

Each of these two ways of forming elongated photoreceptor receptive fields has a potential shortcoming. The main shortcoming of the first pinhole-camera version is that a very small amount of light strikes the photoreceptor. This results in a very small current flowing through the photoreceptor. Because of this, the parasitic capacitance between the photoreceptor (phototransistor) and ground takes more time to charge or discharge. This effectively slows down the photoreceptor so that only slowly changing textures can be detected. Faster intensity changes due to faster optic flow are merely filtered out. This same effect is observable in the second version of the sensor in which point photoreceptors are used with rectangular irises. However, the effective cutoff frequency is higher because more light is let in by the rectangular iris and less parasitic capacitance needs to be overcome in the phototransistors, which are physically smaller.

Considering the above-mentioned shortcoming in a more rigorous fashion, reference is made to FIGS. 1 and 2 wherein FIG. 1 shows a minimal photoreceptor circuit for analysis and FIG. 2 shows a linearized version of the photoreceptor circuit for AC analysis. As shown in FIG. 1, the basic photoreceptor circuit 10 consists of a PNP phototransistor 12 and a diode-connected MOSFET 14. The phototransistor 12 connects to ground (or the substrate) an amount of current proportional to the total light striking its surface. The diode-connected MOSFET 14 converts the photoreceptor current into a voltage. Typically MOSFET 14 is wide enough so that it is biased in the subthreshold region. When a diode-connected MOSFET is in the subthreshold region, the current flowing through it is of the form $$I_{diode} = I_s \exp(kV_{gs}) \tag{Eq. 1}$$

where $I_s$ is dependent on the MOSFET geometry (and fabrication process), $V_{gs}$ is the gate to source voltage, and k is dependent on the fabrication process. Thus, the voltage drop across MOSFET 14 is a logarithmic function of the phototransistor current. Typical k values are on the order of 50–100 mV. Accordingly, as a result of the logarithmic compression, several orders of magnitude of light intensity can be handled by the photoreceptor circuit 10.

As indicated above, FIG. 2 shows a linearized version of the photoreceptor circuit for a specific operating phototransistor current loop. This linearization is performed in exactly the same manner as is used to analyze simple transistor amplifier circuits. The phototransistor is modeled as a current source $I_{in}$ in parallel with a capacitance $C_p$. The current source $i_{in}$ represents or refers to the deviation in current from the operating point current $I_{diode}$. The capacitance $C_p$ represents or refers to the parasitic capacitance between the phototransistor and the substrate. The diode-connected MOSFET 14 can be reduced to a conductance $g_m$, since the gate is connected to the drain. This transconductance $g_m$ is computed from Eq. 1 by linearizing about the operating point current $I_{diode}$ as follows:

$$g_m \equiv \frac{dI_{diode}}{dV_{gs}} = I_s k \exp(kV_{gs}) \tag{Eq. 2}$$

$$g_m = I_s k \exp\left(k \frac{1}{k} \ln \frac{I_{diode}}{I_s}\right)$$

(by substituting in Eq.1 solved for $V_{gs}$)

$$g_m = I_s k \exp\left(\ln \frac{I_{diode}}{I_s}\right) = I_s k \frac{I_{diode}}{I_s} = k I_{diode}$$

Thus, it will be seen that the transconductance $g_m$ is proportional to the operating point current $I_{diode}$. Parasitic capacitances in MOSFET 14 are neglected here, but if included would be incorporated into $C_p$.

The bandwidth of the photoreceptor circuit is determined by the conductance $g_m$ and capacitance $C_p$, which together form a simple RC low-pass filter of cutoff frequency:

$$f_c = \frac{g_m}{2\pi C_p}.\quad\text{(Eq. 3)}$$

Eq. 2 shows that the conductance $g_m$ increases for higher light levels. Thus the cutoff frequency of photoreceptor circuit is higher for higher light levels than for low light levels. For light levels associated with pinhole cameras, the cutoff frequency can be on the order of a fraction of a Hertz. It is noted that according to the model under consideration, the cutoff frequency is independent of photoreceptor area. If the photoreceptor area is doubled, then $g_m$ and $C_p$ both double, and thus the cutoff frequency remains constant.

The cutoff frequency is much higher for photoreceptor versions or embodiments using a lens to focus an image of the environment onto the focal plane. This is because a lens gathers a large amount of light and focuses it onto the photoreceptors. Thus the value of $g_m$ is increased by up to several orders of magnitude, which increases the bandwidth by an equivalent amount. The main disadvantage of this approach is that a lens is required to gather more light onto the photoreceptors. Of course, in many applications the weight of the lens is not a problem. However, an important optic flow sensor application is in sub-scale "micro" air vehicles of sizes of just several centimeters, and with such vehicles it is not tolerable to have a lens that weighs even a gram.

SUMMARY OF THE INVENTION

According to the invention, a photoreceptor array for an optic flow sensor is provided which addresses both of the shortcomings discussed above. The invention provides a way to sample the visual field with rectangular shaped receptive fields without a lens, and without resulting in an extremely low cutoff frequency. Further, the invention is perfectly suited for micro-mechanical systems (MEMS) applications such as those to which reference was made above.

In accordance with the invention, an optic flow sensor is provided which comprises a plurality of photoreceptor circuits, arranged in a linear array, for sensing light received from a visual field and for producing a plurality of photoreceptor signals in accordance with the light sensed; a negative iris disposed between the visual field and the photoreceptor circuits for blocking a portion of the light from the visual field so that the light blocked by the negative iris is not received by the photoreceptor circuits; and optic flow determining means responsive to said photoreceptor signals for determining optic flow in the visual field.

In one preferred embodiment, the negative iris comprises a rectangular light blocking element. Advantageously, the photoreceptor circuits comprise rectangular photoreceptors. Preferably, the rectangular photoreceptors extend parallel to the rectangular iris.

In an alternative preferred embodiment, the negative iris comprises a plurality of light blocking elements. Advantageously, the light blocking elements are rectangular in shape.

According to a further preferred embodiment the negative iris comprises at least one substantially point shaped light blocking element and said photoreceptor circuits comprise rectangular photoreceptors.

In accordance with yet another embodiment, the negative iris comprises a colored iris element for blocking a sub-band of white light.

In a preferred implementation, the sensor further comprises contrast enhancing means for enhancing the contrast levels of the photoreceptor signals. In a first embodiment, the contrast level enhancing means comprises a circuit for receiving the photoreceptor signals, for computing a mean value for the photoreceptor signals and for computing, for each photoreceptor circuit, the difference between the photoreceptor signal for that photoreceptor circuit and said mean. In an alternative embodiment, wherein the optic flow determining means comprises a plurality of feature detectors for receiving the photoreceptor signals, the contrast level enhancing means comprises amplifying means for increasing the amplification of the feature detectors.

In a preferred embodiment, the optic flow sensor is implemented in micro-electromechanical systems technology and the negative iris comprises an etched iris structure.

Other features and advantages of the invention will be set forth in, or will be apparent from, the detailed description of preferred embodiments of the invention which follows.

BRIEF DESCRIPTION OF THE DRAWINGS

FIG. 3 is a photoreceptor array constructed in accordance with a preferred embodiment of the invention;

FIG. 4 is a top plan view of the negative iris of FIG. 3;

FIG. 5 is a top plan view of the photoreceptor array of FIG. 3;

DESCRIPTION OF THE PREFERRED EMBODIMENTS

Figure 2:
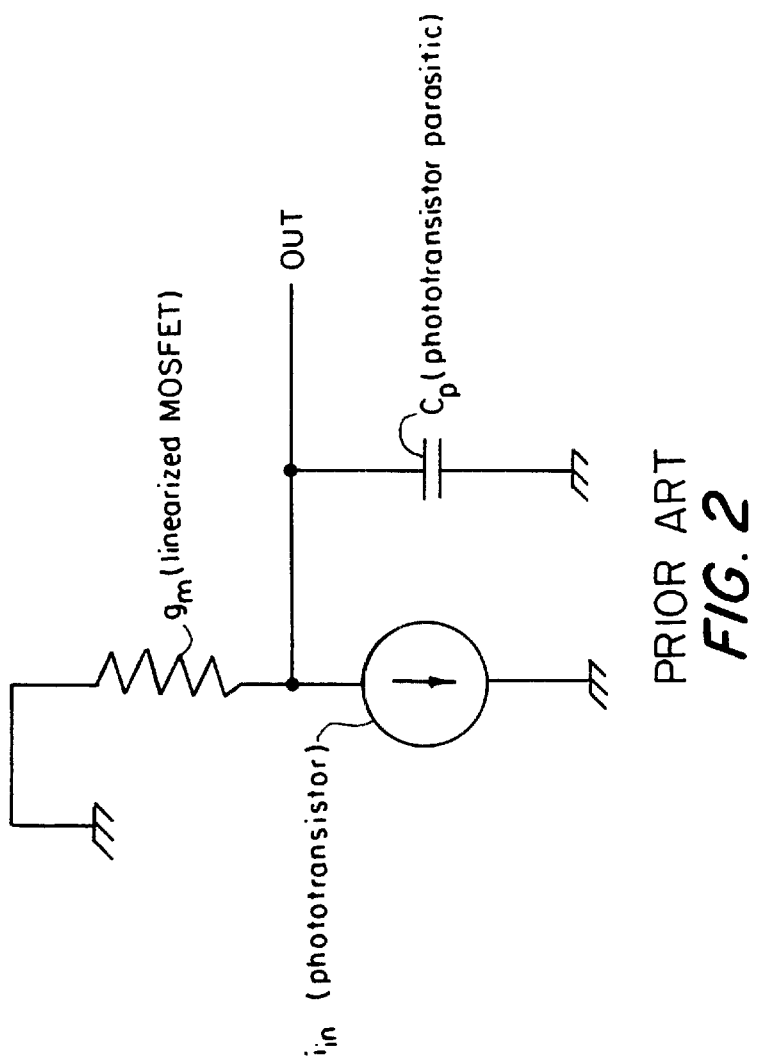
FIGS. 1 and 2, which were described above, are, respectively, a schematic circuit diagram of a prior art photoreceptor circuit and a linearized version of the photoreceptor circuit of FIG. 1.
Figure 1:
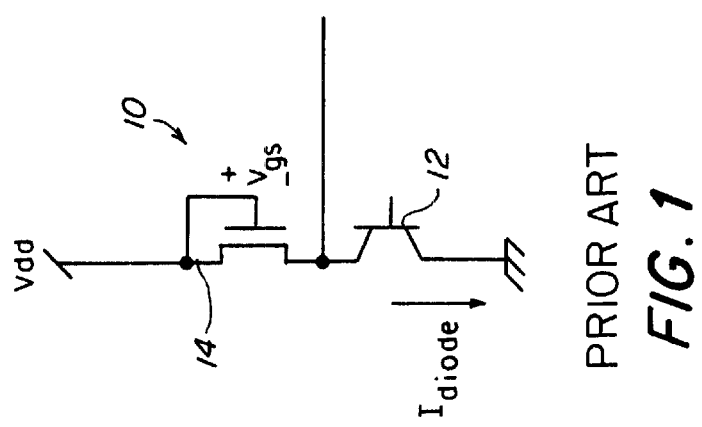

Referring to FIGS. 3, 4 and 5, there is shown a photoreceptor arrangement, generally denoted 16, including a negative iris 18 and a focal plane chip 20 on which there is disposed an array of photoreceptor circuits or photoreceptors 22. The photoreceptors 22 are arranged in a linear array along the sensor orientation vector (denoted SOV in FIG. 5) and have associated output connections 22a. It is noted the "dashed line box" 24 surrounding the negative iris in FIGS. 3 and 4 is not a physical structure but simply indicates the plane in which the negative iris is located. These photoreceptor circuits 22 are preferably the same as in the aforementioned U.S. Pat. No. 6,194,695 B1, although other photoreceptor circuits and variations as are well known in the art may also be used as photoreceptor circuits 22. The negative iris 18 is rectangular shaped and has essentially the same function as the rectangular iris in the just mentioned patent with the exception that iris 18 blocks light rather than passes light. The negative iris 18 will still produce an image of the visual field onto the focal plane; however, the image will be a negative of the outer world and the image contrast on the photoreceptors 22 will be significantly lower than that of the visual field. The photoreceptors 22 themselves can be rectangular shaped, extending in the same direction as the negative iris 18, or can be point shaped. In an alternative embodiment, the negative iris would be approximately point shaped and the photoreceptors are rectangular shaped.

However, the disadvantage of this latter arrangement is that the contrast of the image on the focal plane is further reduced over and above the already reduced contrast from the rectangular negative iris.

The main advantage of the negative iris arrangement is that more light strikes the photoreceptors 22 with the negative iris 18 than with a positive iris. Thus the value of $g_m$, from FIG. 2, is significantly increased which also increases the bandwidth of the corresponding photoreceptor. Increases of as much as two or three orders of magnitude in bandwidth are possible over that of the positive iris version, depending on the specific shape of the iris. Thus, for a given desired bandwidth or cutoff frequency, the photoreceptor array 22 will be able to function under much lower light levels with the negative iris 18.

Figure 6:
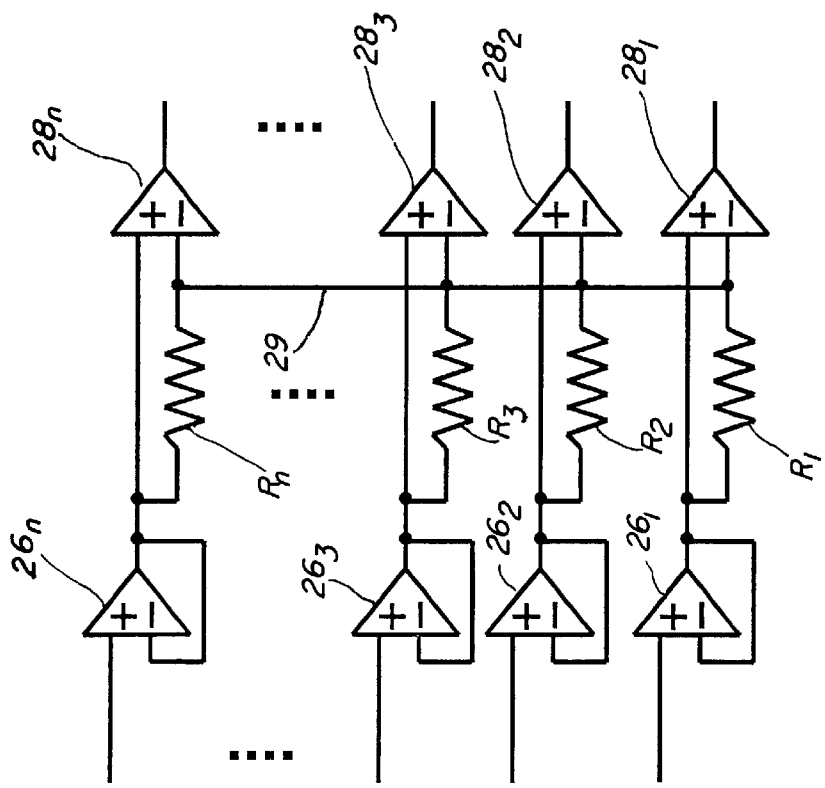
FIG. 6 is a schematic circuit diagram of a contrast enhancing circuit which is used in accordance with one preferred embodiment of the invention.

As indicated above, an important advantage of the use of a negative iris is the increase provided in the bandwidth of the photoreceptor. The main disadvantage of this approach is that the contrast levels are significantly reduced over that of the positive iris. Thus, in order to bring the contrast levels up to a practical level, the outputs of the photoreceptor circuits need to be amplified to recover the lost contrast. One method of doing this is with a "silicon retina" type of circuit. FIG. 6 shows a circuit corresponding to that disclosed in the aforementioned U.S. Pat. No. 6,194,6951 B1. The circuit includes a first set of operational amplifiers $26_1, 26_2, 26_3 \ldots 26_n$ which function as buffers. A further set of operational amplifiers $28_1, 28_2, 28_3 \ldots 28_n$, which function as differential amplifiers, and a like plurality of resistors $R_1, R_2, R_3 \ldots R_n$ are connected as shown. The inputs to buffer amplifiers $26_1, 26_2, 26_3 \ldots 26_n$ are connected to receive photoreceptor signals, while the outputs of differential amplifiers $28_1, 28_2, 28_3 \ldots 28_n$ form the outputs of the circuit. A common node 29 contains the average of the voltages. The circuit of FIG. 6 computes the mean of the input signals and computes for each photoreceptor the difference between the photoreceptor signal and the mean. This effectively recovers the lost contrast caused by using the negative iris 18. Other silicon retinas, circuits, or variations useful for enhancing contrast known to those skilled in the art are also within the scope of the present invention.

Alternatively, if the output signals from photoreceptor circuit 22 are sent to feature detectors (not shown), such as disclosed in the above-mentioned U.S. Pat. No. 6,020,953, the lost contrast can be compensated for by increasing the amplification of the feature detectors.

Figure 7:
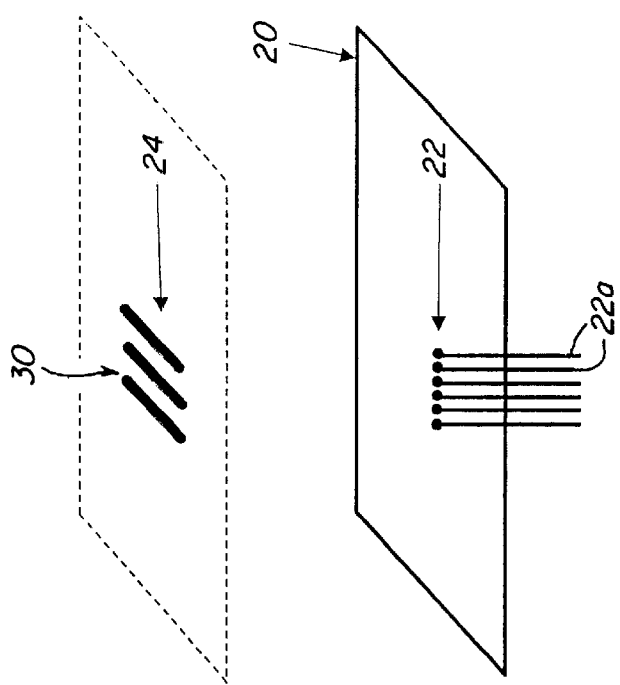
FIG. 7 is a perspective view of a photoreceptor array in accordance with a further preferred embodiment of the invention.

It is noted that if the photoreceptor array of FIGS. 3 to 5 is to be used in a system such as disclosed in U.S. Pat. No. 6,02,953, where feature signals are to be generated, alternative iris shapes can be implemented. For example, FIG. 7 shows a more complex negative iris pattern in which several rectangles 30 are used. The response function of a single photoreceptor of photoreceptor array 22 associated with this iris pattern will have a "wiggle" shape, looking approximately like a wavelet. This photoreceptor signal can be used "as-is" to form a feature signal or can be further combined with other feature detectors to produce yet other types of feature signals.

In a further alternative embodiment, rather than using a monochrome negative iris that blocks light or passes light of all frequencies, one or more colored rectangular shapes can be used that block or pass light of a sub-band of white light. The colored rectangular shapes can all be the same color, or they can each be of a different color. If more than one colored rectangular shape is used, each rectangular shape can be of a different color.

As indicated above, the present invention is especially suited for implementation in micro-electromechanical systems (MEMS) technologies. The iris 18 of FIGS. 3 and 4 and the iris 30 of FIG. 7 could be formed by a structure that simply pops up off the surface. The advantage of using a negative iris for such MEMS implementations over the use of a positive iris is that negative iris structures would be more easily etched than positive iris structures. This is because in order to generate free components using MEMS, any large planar surface fabricated must have a number of holes in the plane to allow the etchant to reach under and free the structure from the substrate. A positive iris would require a large surface, except for the aperture. There would have to be other holes in this aperture which would reduce the effectiveness of the iris. A negative iris is simply a small structure which would not require such holes.

It is noted that the various embodiments of the invention described above can also be implemented in two dimensions. In this implementation, the photoreceptor array would comprise a two dimensional array of point photoreceptors and the shape of the negative iris would be relatively compact.

Referring again to FIG. 3, it is to be understood that the remainder of the optic flow sensor or optic flow determining means of the invention, i.e., the system of further units of the optical flow sensor which processes the output signals 22a of FIG. 3, preferably take the form of that of one of the sensors described in detail in the above-mentioned U.S. Pat. Nos. 6,020,953 and 6,194,695 B1 or is otherwise conventional, and because of this, the overall optic flow system will not be further described.

Although the invention has been described above in relation to preferred embodiments thereof, it will be understood by those skilled in the art that variations and modifications can be effected in these embodiments without departing from the scope and spirit of the invention.

What is claimed is:

1. An optic flow sensor comprising:
   a plurality of photoreceptor circuits for sensing light received from a visual field and for producing a plurality of photoreceptor signals having contrast levels in accordance with the light sensed said photoreceptor circuits being arranged in a linear array;
   a negative iris comprising a plurality of light blocking elements disposed between the visual field and the photoreceptor circuits for blocking a portion of the light from the visual field so that the light blocked by the negative iris is not received by the photoreceptor circuits;
   a contrast level enhancing means for receiving the photoreceptor signals for computing a mean value for the photoreceptor signals and for computing the difference between the photoreceptor signal for that photoreceptor circuit and said mean value and for enhancing the contrast levels of the photoreceptor signals; and
   optical flow determining means responsive to said photoreceptor signals from said contrast level subhousing means for determining optic flow in the visual field.

2. An optic flow sensor according to claim 1 wherein said negative iris comprises a rectangular light blocking element.

3. An optic flow sensor according to claim 2 wherein said photoreceptor circuits comprise rectangular photoreceptors.

4. An optic flow sensor according to claim 3 wherein said rectangular photoreceptors extend parallel to said rectangular iris.

5. An optic flow sensor according to claim 1 wherein said light blocking elements are rectangular in shape.

6. An optic flow sensor according to claim 1 wherein said negative iris comprises a substantially point shaped light blocking element and said photoreceptor circuits comprise rectangular photoreceptors.

7. An optic flow sensor according to claim 1 wherein said negative iris comprises a colored iris element for blocking a sub-band of white light.

8. An optic flow sensor according to claim 1 wherein the optic flow determining means comprises a plurality of feature detectors for receiving said photoreceptor signals and said contrast level enhancing means comprises amplifying means for increasing the amplification of said feature detectors.

9. An optic flow sensor according to claim 1 wherein said optic flow sensor is implemented in microelectromechanical systems technology and said negative iris comprises an etched iris structure.

10. An optic flow sensor comprising:

a plurality of photoreceptor circuits for sensing light received from a visual field and for producing a plurality of photoreceptor signals in accordance with the light sensed said photoreceptor circuits comprising photoreceptors defining a sensor orientation vector, said photoreceptors each having a response function of a rectangular shape defining a longitudinal axis extending perpendicular to said sensor orientation vector and being arranged in a linear array;

a negative iris of a rectangular shape comprising a plurality of light blocking elements, disposed between the visual field and the photoreceptor circuits and extending perpendicular to said sensor orientation vector, for blocking a portion of the light from the visual field so that the light blocked by the negative iris is not received by the photoreceptor circuits; and a contrast level enhancing means for receiving the photoreceptor signals for computing a mean value for the photoreceptor signals and for computing the difference between the photoreceptor signal for that photoreceptor circuit and said mean value, and for enhancing the contrast levels of the photoreceptor signals; and optic flow determining means responsive to said photoreceptor signals from said contrast level subhousing means for determining optic flow in the visual field.

11. An optic flow sensor according to claim 10 wherein said negative iris comprises a colored iris element for blocking a sub-band of white light.

12. An optic flow sensor according to claim 10 wherein said optic flow sensor is implemented in microelectromechanical systems technology and said negative iris comprises an etched iris surface.

* * * * *

UNITED STATES PATENT AND TRADEMARK OFFICE
CERTIFICATE OF CORRECTION

| | | |
|---|---|---|
| PATENT NO. | : 6,493,068 B1 | Page 1 of 1 |
| DATED | : December 10, 2002 | |
| INVENTOR(S) | : Barrows | |

It is certified that error appears in the above-identified patent and that said Letters Patent is hereby corrected as shown below:

<u>Title page,</u>
Item [74], *Attorney, Agent, or Firm,* "John G. Mills III" should read -- John Gladstone Mills III --

Signed and Sealed this

Twentieth Day of July, 2004

JON W. DUDAS
*Acting Director of the United States Patent and Trademark Office*